March 19, 1946. M. VOITY 2,396,933
APPARATUS FOR MANUFACTURING SLIDE FASTENERS
Original Filed Nov. 1, 1940 6 Sheets-Sheet 1
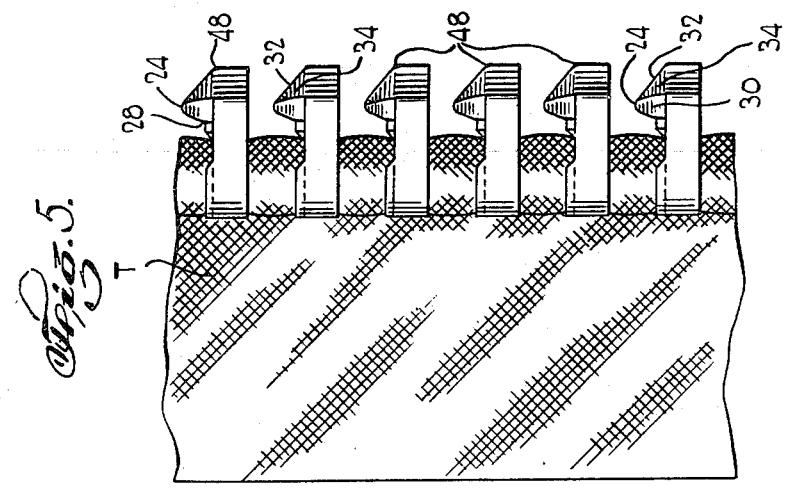
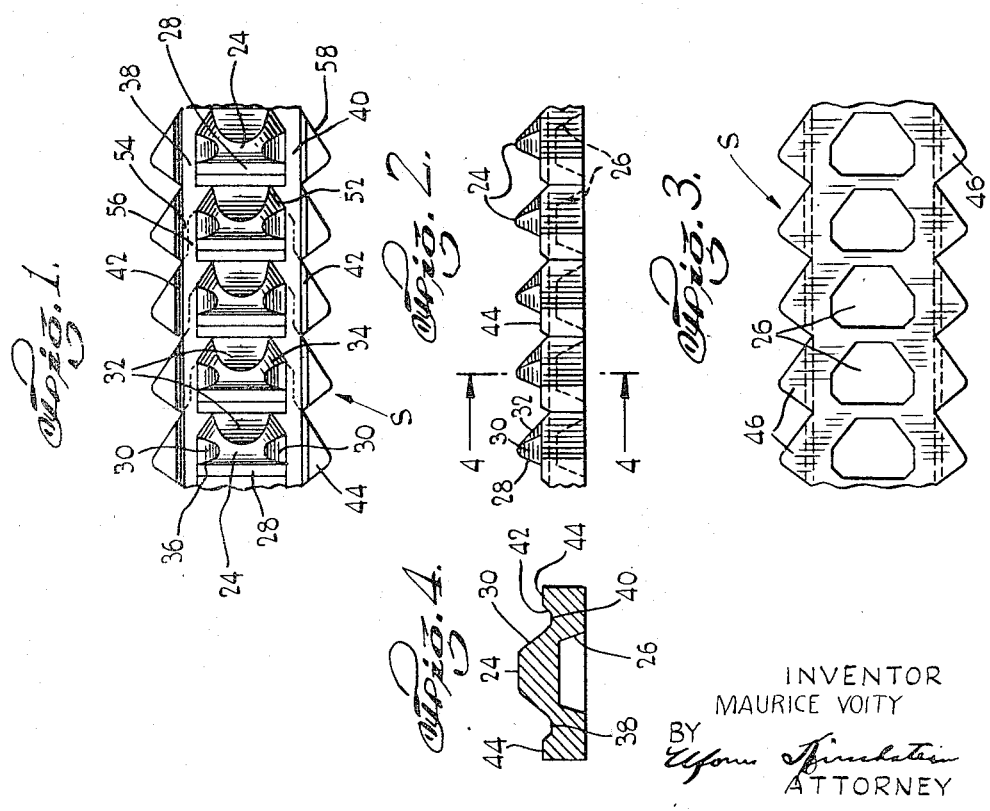
INVENTOR
MAURICE VOITY
BY
ATTORNEY

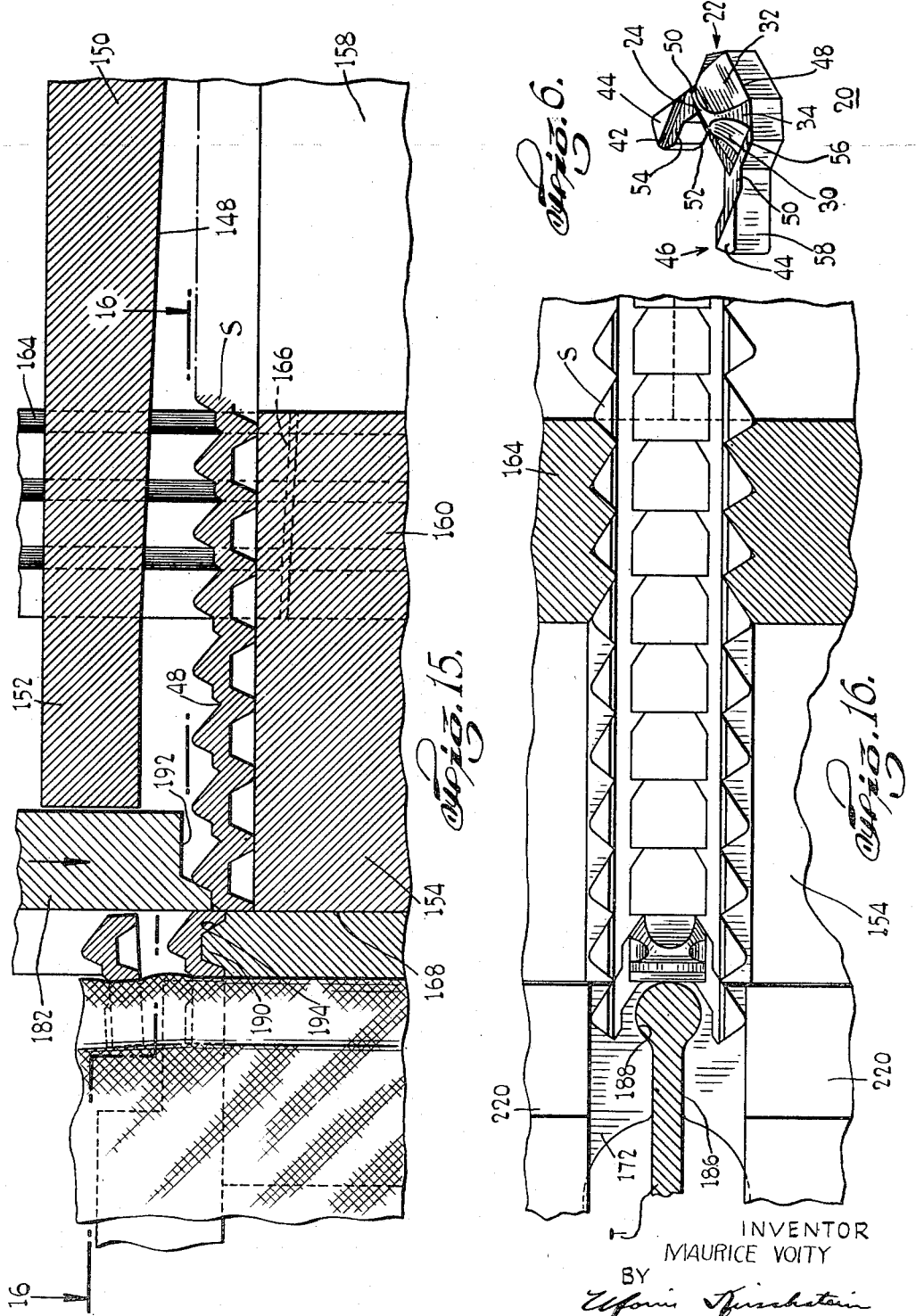

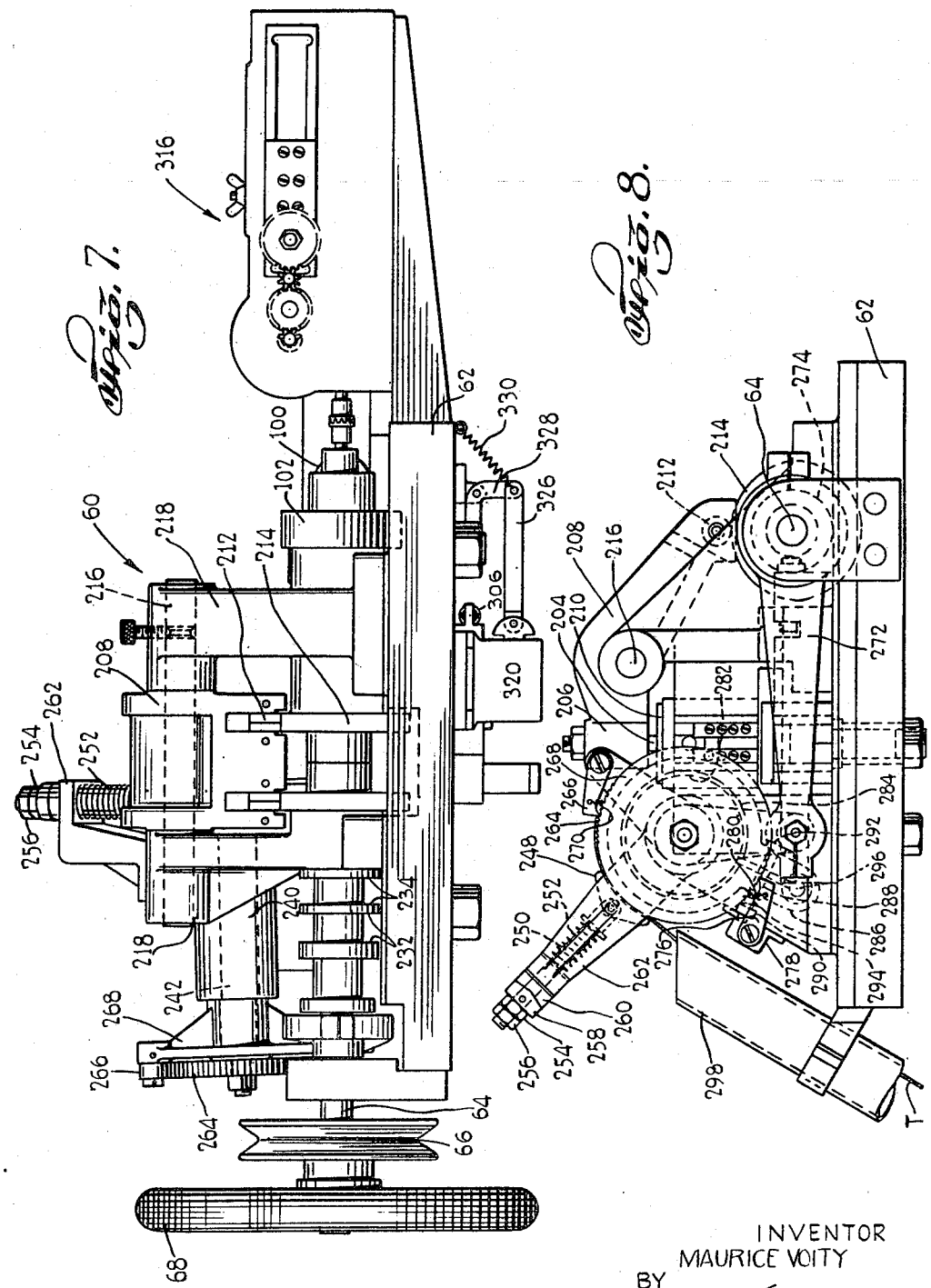

March 19, 1946. M. VOITY 2,396,933
APPARATUS FOR MANUFACTURING SLIDE FASTENERS
Original Filed Nov. 1, 1940 6 Sheets-Sheet 4
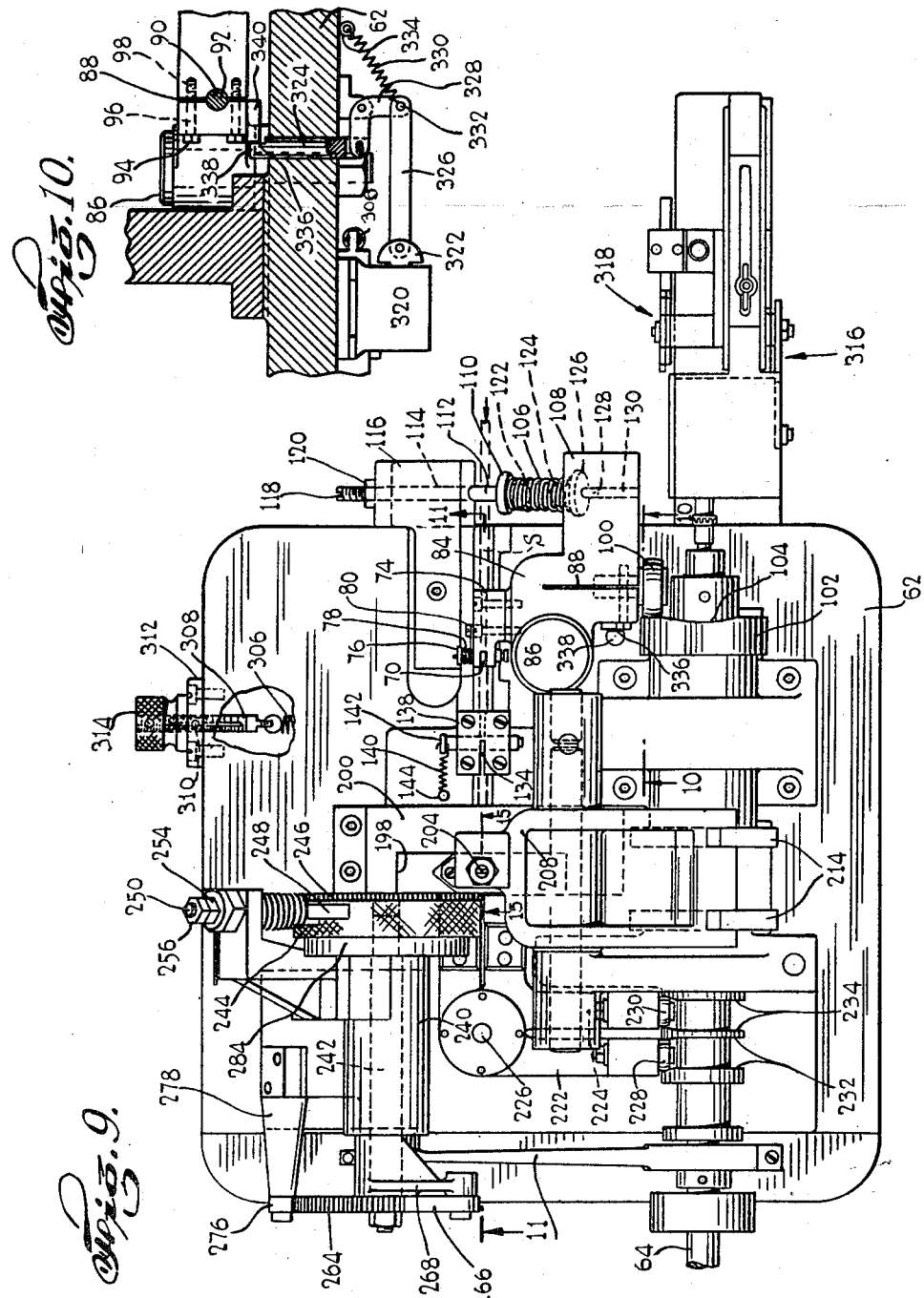
INVENTOR
MAURICE VOITY
BY
ATTORNEY

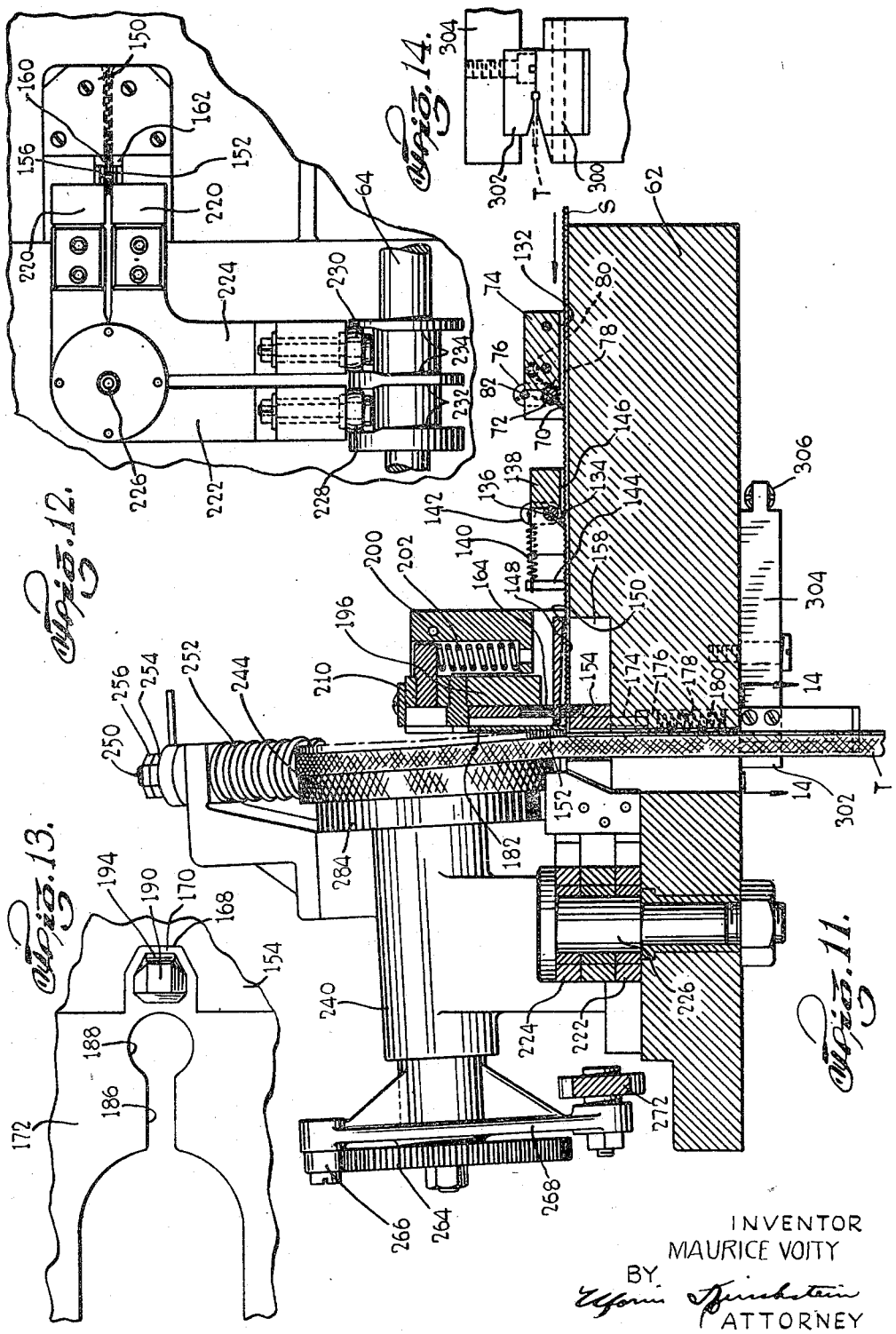

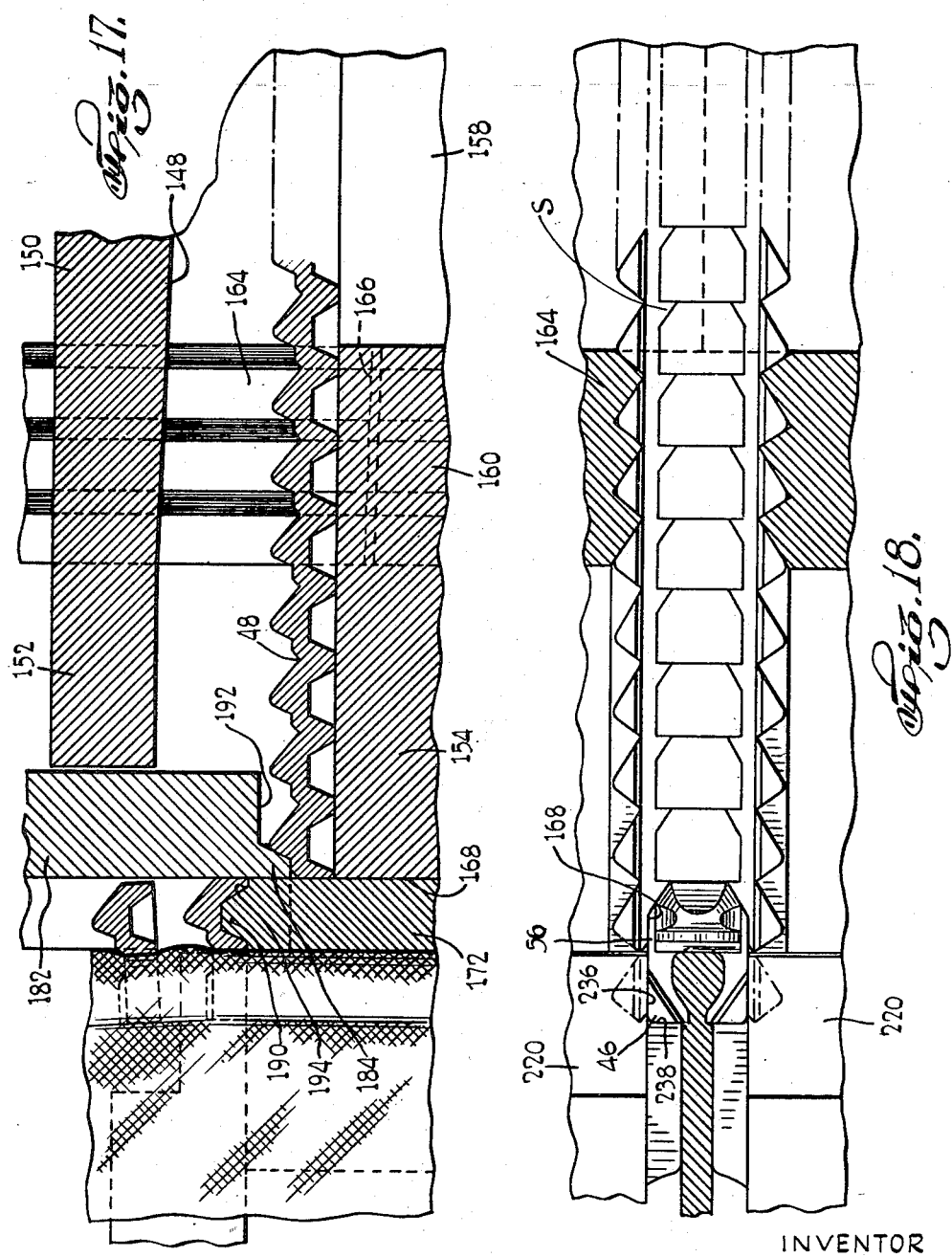

Patented Mar. 19, 1946

2,396,933

UNITED STATES PATENT OFFICE 2,396,933

APPARATUS FOR MANUFACTURING SLIDE FASTENERS

Maurice Voity, New York, N. Y., assignor to Universal Slide Fastener Co., Inc., Long Island City, N. Y., a corporation of New York Original application November 1, 1940, Serial No. 363,805. Divided and this application March 26, 1942, Serial No. 436,279

5 Claims. (Cl. 164—48)

This invention relates to slide fasteners, and more particularly to apparatus for manufacturing the same, wherein long strips of integrally connected embryonic slide fastener elements are employed.

One of the objects of my invention is to provide an improved means for successively severing individual elements from a strip of embryonic integrally connected elements and clamping said individual elements on a tape.

Another object of my invention is to provide a means of the character described which shall be capable of fabricating slider stringers with great speed and precision.

Other objects of this invention will in part be obvious and in part hereinafter pointed out.

This application is a division of my copending application for Method and apparatus for manufacturing slide fasteners, Serial No. 363,805, filed November 1, 1940.

The invention accordingly consists in the features of construction, combinations of elements, and arrangement of parts which will be exemplified in the construction hereinafter described, and of which the scope of application will be indicated in the claims.

In the accompanying drawings, in which is shown one of the various possible embodiments of this invention, Figs. 1, 2 and 3 are top, side and bottom views, respectively, of a strip of embryonic integrally connected slide fastener elements formed in accordance with my invention;

Fig. 4 is a sectional view of said strip taken along the line 4—4 of Fig. 2;

Fig. 5 is a side view of a part of a completed slider string;

Fig. 6 is an enlarged perspective view of an individual slide fastener element separated from the formed strip but before it is clamped on a tape;

Figs. 7, 8 and 9 are side, end and plan views, respectively, of a severing and clamping apparatus embodying my invention;

Fig. 10 is a sectional view taken along the line 10—10 of Fig. 9, and illustrating the mechanism employed to intermittently stop the feed of the formed strip in order to provide a space between groups of slider elements clamped on a tape;

Fig. 11 is a transverse sectional view of the apparatus taken along the line 11—11 of Fig. 9;

Figs. 12 and 13 are details, respectively, of the clamping mechanism and shearing anvil;

Fig. 14 is a sectional view taken along the line 14—14 of Fig. 11 and is explanatory of the tape tensioning shoes;

Fig. 15 is an enlarged view taken along the line 15—15 of Fig. 9 showing a step during the operation of severing an embryonic slide fastener element from the formed strip;

Fig. 16 is a sectional view taken along the line 16—16 of Fig. 15; and

Figs. 17 and 18 are views similar to Figs. 15 and 16 but showing a further step.

Referring now to the drawings and more particularly to Figs. 1 through 4, I have shown a strip S of integrally connected slide fastener elements 20. Said strip may be fabricated on any suitable forming apparatus, such as for example that shown and described in my said copending application. Said elements 20 are all faced in the same direction in the strip S (see Figs. 1–6) and each element 20 comprises a head 22 having the usual locking projection 24 and underlying socket 26. The projection 24 is provided with front, side and rear sloped guiding surfaces 28, 30 and 32 joined by concavely rounded corners 34 and abrupt edges 36. Said projections 24 rise from between a pair of parallel coplanar flats 38 and 40, which are joined by slopes 42 to the upper surface 44 of the embryonic jaws 46.

It will be noted that the lowest point 48 on the rear guiding surface 32 is disposed below the jaw surface 44, thus enabling the elements 20 to clear each other more easily in the interlocking operation.

The embryonic jaws 46 comprise a pair of spread legs 50, which are cut from the flats 38 and 40 along the dotted lines indicated in Fig. 1, in a manner hereinafter to be described. Each of the legs 50 projects angularly from its associated head 22 and includes an inner portion 52 (Fig. 1) which lies outside of and immediately adjacent the locking projection 24 on the next following slider element 20; an intermediate portion 54 which lies outside of and immediately adjacent a flat portion 56 of the locking projection on the next following slider element 20; and an outer portion 58 which comprises one of the serrations forming an edge of the strip S.

The strip S is fed from a bobbin on which it is wound after fabrication into a high speed stringer assembling machine 60 (Figs. 7, 8, 9 and 11) embodying my invention, which machine successively cuts embryonic slide fastener elements 20 from the strip and attaches them in properly spaced relationship upon the slider tape T. The machine 60 is mounted on a bedplate 62 and the several moving parts thereof are actuated by a single drive shaft 64 which is disposed transversely of the direction of feed of the strip. The drive shaft may be actuated in any suitable fashion, as by means of a pulley 66 which is connected by a belt (not shown) to the drive pulley of an electric motor (not shown). A hand wheel 68 may also be employed to turn the shaft over by hand when the machine is being adjusted.

The strip S is advanced during the interval between the cutting and clamping of a slide fastener element 20 by a feed dog 70 set in a shaft 72 which is rotatably mounted in a feed block 74. One end of said shaft 72, which projects beyond a side of the block 74, has an arm 76 fixed thereto. A spring 78 encircling the shaft 72 is anchored at one end thereof by a screw 80 threaded into an aperture in the block 74, the other end thereof passing through a hole 82 in the arm 76. In this manner the feed dog 70 is constantly urged in a counterclockwise direction, as viewed from Fig. 11, so that when the same is moved towards the clamping and severing portion of the machine 60, said feed dog will press against the rear surface 32 of an embryonic slide fastener element 20 to advance the strip S. When the feed dog 70 is moved backwardly, the lower end thereof will ride over the locking projection 24 of an embryonic element 20 and come to rest immediately above the lowest point 42 on the said rear surface 32 ready to again advance the strip S.

In order to move the feed dog 70 in the manner thus described, the block 74 is attached in any suitable manner to a feed lever 84, which oscillates about a pivot 86 and is provided with a slit 88 (Figs. 9 and 10) and co-axial bore 90. A shaft 92 is held in the bore 90 by means of a pair of screws 94 which freely pass through apertures 96 disposed on one side of the slit 88. Said screws are received in tapped holes 98 disposed on the other side of said slit. It is thus seen that when the screws 94 are tightened so that their heads press against a side wall of the feed lever 84, the portions of said lever disposed on either side of the slit 88 will be sprung toward each other to grip the shaft 92 immovably therebetween.

The end of the shaft 92 projecting from the feed lever 84 has a circular cam follower 100 mounted to freely rotate thereon. Said cam follower rides upon the surface of a side-face cam 102 mounted on the drive shaft 64 for rotation therewith. Said cam 102 has only a single low point 104, the balance of the cam surface being otherwise of uniform height, so that the feed dog is actuated only once, for a very short period of time, during a single cycle of operation of the machine 60.

In order to cause the cam follower 100 to constantly engage the cam 102, a spring 106 may be held under compression between an arm portion 108 of the feed lever 84 and the enlarged head 110 of a threaded rod 112 which is adjustably received in a tapped hole 114 of a casting 116 mounted on the bedplate 62. The compression under which the spring 106 is maintained may be varied by rotating the rod 112 by means of a slot 118 formed at the free end thereof, and a lock nut 120 may be employed to hold the rod 112 in any adjusted position. Also, in order to prevent the spring 106 from slipping, a nub 122 may be formed on the enlarged head 110 of the rod 112 and a similar aligned nub 124 provided on a disc 126 which is attached to the arm portion 108 by means of a pin 128 frictionally received in an aperture 130 therein.

To aid in guiding the strip through the machine 60, the under surface of the block 74 may be channeled to provide a passageway 132.

A check dog 134 in alignment with the feed dog 70 serves to prevent the strip S from being pulled back during retrograde movement of the feed dog 70. Said check dog 134 is set into a slot in a shaft 136 rotatably carried in a check block 138 fixed to the bedplate 62. A pull spring 140 engages an arm 142 mounted on an end of the shaft 136 projecting beyond one side of the block 138, the other end of the spring 140 being anchored to a post 144 set in the bedplate 62.

By this construction the tip of the check dog 134 will be raised upwardly by the locking projection 24 of an embryonic slide fastener element 20 when the strip S is advanced, thus allowing the head 22 to freely pass thereunder. However, as soon as one of the heads has passed beyond the check dog 134, the latter will spring back to lie against the rear surface 32 of the head and thus prevent a retrograde movement thereof. The forward end of the block 138 may also have a channel 146 cut on the bottom surface thereof in alignment with the channel 132 in the feed block 74 to aid in further guiding the strip.

After the strip S passes the check dog 134, it is introduced into the guide channel 148 cut in the under surface of a stripper 150 (Figs. 11 and 12) attached to bedplate 62. A finger 152 protrudes from the forward surface of the stripper 150 to prevent the strip S from being deformed during retraction of the severing die. It will be noted that the top surface of the channel 148 gradually slopes upwardly (as best shown in Fig. 11, where the slope is exaggerated), so that the forward end of the channel is elevated over the rear end of the channel a distance slightly greater than the depth of the socket 26 in the embryonic slide fastener element. The forward end of the strip S may thus be fed over a positioning nub, hereinafter mentioned, on the shearing anvil. The under surface of the finger 152 is also disposed at the higher level of the forward end of the channel 148.

Underlying the finger 152 and a portion of the forward end of the channel 148 is a floating pad 154 which is received in a sliding fit in a recess 156 in a two-piece jacket 158 doweled to the bedplate 62. The rear end of the pad 154 has a projecting ledge 160 which lies in a short cavity 162. Said ledge is provided on its opposite longitudinal sides with serrations similar in size and shape to the serrated edges of the strip S to cooperate with a pair of reciprocating serrated pilots 164 for accurately locating and rigidly holding the forward end of the strip S prior to and during shearing and clamping. The lower edge 166 of the pilot may be raked to facilitate registry of the strip. The forward face of the pad 154 is channeled as at 168 (Fig. 13) to snugly fit around a portion 170 of a shearing anvil 172 having a sectional contour corresponding to the outline of the head 22 of a slide fastener element. The pad 154 is urged upwardly against stops on the jacket 158 by a rod 174 attached to a plunger 176 sliding in a bore 178 in the bedplate 62, and a spring 180 is disposed in the said bore 178 beneath the plunger.

The cutting of the foremost embryonic slider fastener element 20 on the strip S is performed by a reciprocating punch 182 having a thin severing edge 184 shaped similarly to the anvil 170. The lower surface of the punch 182 is spaced slightly above the lower surface of the pilots 164.

The shearing anvil 172 is suitably held rigidly in a slot which runs from top to bottom of the jacket 158 and faces the recess 156, thus allowing the forward portion 170 to project thereinto, in the manner above described. A deep vertical slot 186 is formed along the entire length of the anvil 172 and is enlarged at its forward end into a circular aperture 188 positioned in proper relationship to the projecting portion 170 to receive and thereby accurately locate the head of the tape T with respect to the slide fastener elements. A small nub 190 on the upper face of the portion 170 is shaped so as to be snugly received in a socket 26 of a slider element 20. The rear portion of the punch 182 may be relieved as indicated at 192, since it is not necessary to conform the lower face of said plate to the contour of the upper face of the strip.

It is thus seen that when the strip S is advanced one step by the feed dog 70, the forward edge of the foremost embryonic slide fastener element 20 will encounter the sloped forward surface 194 of the positioning nub 190, to cause the front part of the strip S to ride upwardly into engagement with the upper surface of the channel 148. Thereupon, said foremost element will clear the nub 190. The strip will then drop down with said foremost edge abutting the tape bead, the jaws 46 straddling the tape and the foremost socket 26 being fitted on the positioning nub 190. The pilots and punch 164 and 182 next simultaneously move downward to accurately position and hold the strip S and immediately thereafter cut off said foremost element 20. During the shearing operation, the pad 154 will be forced downwardly by the shearing plate 182, as indicated in Figs. 15 and 17, leaving the severed element remaining on the anvil 172. I have found that by thus positioning the element 20 to be severed on a stationary anvil during the shearing and allowing the strip to be moved with respect thereto, a high degree of accuracy is obtained in the spacing of the severed elements along the tape. When the punch is retracted, the pad 154 will move upwardly until its top surface is flush with the top surface of the anvil 172, to allow the next forward feeding movement of the strip. Also the upward movement of the pad 154 strips the jaws 46 of the next embryonic element 20 from the anvil portion 170.

In order to provide for reciprocation of the pilots and punches 164 and 182, the latter are clamped to a head 196 guided in vertical slideways 198 provided in a standard 200 mounted on the bedplate 62 over the stripper 150. The head 196 is intermittently forced in a downward direction against the action of a compression spring 202 by a screw 204 (Fig. 8) adjustably carried on the driving end 206 of a bell crank lever 208. Said screw abuts, for this purpose, a hardened plate 210 carried by the head 196. The other end of the lever 208 is provided with a pair of rollers 212, which ride on cams 214 rotating with the drive shaft 64. The lever 208 is journalled on a shaft 216 supported by posts 218.

The slider elements 20 are clamped to the tape T by a pair of coacting clamping jaws 220 rigidly attached to the ends of bell crank levers 222 and 224 pivoted about a pin 226. The levers 222 and 224 are actuated by a pair of rollers 228 and 230 riding in a pair of symmetrical oppositely acting channel cams 232 and 234, which are mounted on the drive shaft 64 in proper angular relationship to the other operating cams.

It should be particularly noted that the cams 232 and 234 are so arranged that the jaws 220 begin to exert a clamping action upon the spread jaws 46 of the foremost slider element 20 immediately before the shearing is completed, as indicated in Figs. 15 and 16, where the clamping has just begun, so that the position of an element is always controlled.

Attention is also directed to the formation of the jaws 46 after clamping is completed (Fig. 18). The outer edge 236 of the jaw, which previously comprised one of the inclined edges of the serrated strip S, is disposed in registration with the outer edge of the flat 66 on the head 22, and the forward edge 238 which previously comprised the other inclined edge is disposed perpendicularly to the said outer edge 236, thus providing a square edge and a comparatively large surface for the slider ways to engage.

I provide the following mechanism for supporting the tape under tension during clamping and to advance the same intermittently between each clamping operation:

Journalled in a bearing 240 supported on the bedplate 62 is a shaft 242 which has keyed at one end a knurled tape drum 244 having an annular recess 246 in which the slider elements 20, after assembly on the tape, are received. A smooth-faced shoe 248 pivotally mounted at the lower end of a rod 250 is resiliently pressed against the tape T by a compression spring 252 to ensure a good frictional contact of the tape with the drum 244. Adjustment of the shoe pressure may be effected by means of a nut 254 and lock nut 256 threaded on the upper end of the rod 250 and abutting a cammed ring 258 nesting against the correspondingly cammed end 260 of a rod bracket 262. Shoe pressure may be wholly released while threading the tape by turning the ring 258 to disalign its cammed surface with that of rod bracket end 260.

The tape drum 244 is rotated by a ratchet wheel 264 intermittently actuated by a feed pawl 266 pivotally mounted on the upper end of an oscillating bell crank lever 268 journalled about the drum shaft 242. A spring 270 maintains the pawl 266 in constant engagement with the ratchet wheel 264. The lever 268 is angularly reciprocated by a link 272 pivoted to said lever and strapped at its other end around an eccentric 274 rotating with the drive shaft 64. A check pawl 276 is pivotally mounted on a stationary bracket 278 and is maintained in engagement with the ratchet wheel 264 by a spring 280.

Due to the high speed of the machine 60, I have found it desirable to provide means to prevent overdrive of the ratchet wheel 264 and tape drum 244 beyond the effective operating position of the check pawl 276. Such means preferably comprises a brake drum 282 integrally formed with the tape drum 244 and having a suitably lined brake 284 disposed thereabout. The ends of the brake are joined by a split bracket 286 having a pair of aligned apertures 288 in which are provided a tightening bolt 290 and nut 292. A spring 294 may encircle a projecting portion of the bolt shank. A pin 296 holds the bracket 286 to a stationary portion of the machine 60. Thus, by turning the bolt 290 to resiliently spring together the spaced legs of the bracket 286, the proper amount of frictional drag may be applied to the shaft 242, which will allow said shaft to be intermittently advanced under the positive driving action of the feed pawl 266, but will prevent any overdrive. By the use of this brake the minimum of tension may be applied to the tape, in the manner hereinafter described, to keep the tape taut and so prevent stretching of the tape during clamping, which has heretofore resulted in uncontrolled varying of stringer lengths.

Attention is directed to the slight inclination of the shaft 242 which causes the element which has been last fastened to the tape to clear the shearing plate 182 after it has been advanced one step, as clearly shown in Figs. 16 and 17, and to the alignment of the web of the tape with the strip S for its unsupported length between the anvil 172 and tape drum 244. Both these features contribute to highly accurate spacing between the slider elements.

The tape, after it leaves the tape drum 244, is guided through a chute 298 into a container (not shown). The tape is fed from a spool (not shown) to the machine 60 through formed tensioning shoes 300 and 302 (Fig. 14), one of which, 300, is secured to the under surface of the bedplate 62. The other shoe 302 is screwed to one end of a lever 304 pivoted to the bedplate 62 and is resiliently urged against the shoe 300 by a spring 306 caught to the lever 304. The spring is maintained under adjustable tension by a threaded rod 308 having a slotted portion non-rotatably engaging a pin 310 in a bracket 312 fixed to the bedplate 62. A knurled handle 314, which threadedly engages the rod 308 and abuts the bracket 312, is provided to vary the tape tension.

I also provide means for varying the number of slide fastener elements contained in one group and the spacing between such groups. Such means may comprise a suitable counting mechanism 316 actuated by the drive shaft 64 which operates an electric switch 318 connected in series with a source of electric power (not shown) and a solenoid 320 illustrated in energized position in Fig. 10. The solenoid has an internally disposed core plunger 322 which is adapted to actuate a feed dog stop finger 324 through a linkage system, including a straight link 326 and an angled link 328. The system is normally maintained in inoperative position by a spring 330 tensioned between the pivot 332 interconnecting the links 326 and 328 and a pin 334 supported on the under surface of the bedplate 62.

The upper end of the pin 324 is provided with a hardened flat 336 and a hardened upper surface 338, both of which coact with a hardened plate 340 bolted to the under surface of the feed lever 84. The linkage system, pin and plate are so designed that when the solenoid 320 is inoperative the upper surface 338 of the pin is maintained by the spring 330 a few thousandths of an inch below the under surface of the plate 340, and thus does not affect the operation of the oscillating feed lever 84 and feed dog 70. However, as soon as the switch 318 is closed by the counter 316, the solenoid 320 will be energized and urge the pin 324 upwardly. If at this time the plate 340 overlies the upper surface 338 of the pin, the said pin will merely abut thereagainst and will ride on the under surface of the plate while the feed lever 84 oscillates. As soon as the feed dog 70 approaches its furthermost position advancing the strip S, the edge of the plate 340 will clear the pin flat 336, allowing the pin to shoot up to the position shown in Fig. 10, whereupon the oscillation of the lever 84 will be stopped. It will be noted that when the pin 324 is in the above locking position and the cam follower 100 is riding on the dwell of the side-face cam 102, the pin flat 336 will be clear of the plate 340 by a few thousandths of an inch, thus allowing said pin to be retracted by the spring 330 upon de-energization of the solenoid 320 when the switch 318 opens.

It will thus be seen that there is provided an apparatus and method for making slide fasteners in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. An apparatus for making slide fastener elements from a strip having a series of spaced sockets in a surface thereof, said apparatus comprising means to intermittently advance said strip toward a tape with the sockets facing downwardly, means comprising a reciprocating punch to successively sever the strip from the foremost slide fastener element thereon, each element including one of said sockets, and an anvil coacting with said punch, said anvil having a nub which extends into the socket of the foremost element to support the same and prevent the socket from collapsing during severance of the strip from said element.

2. An apparatus as set forth in claim 1 wherein said nub is negatively shaped to match the contour of the sockets.

3. An apparatus for making slide fastener elements from a continuous strip having a plurality of identical slide fastener elements formed and uniformly arranged thereon, each element including a pair of diverging jaws, a projecting portion of each of which comprises a serration in each longitudinal edge of said strip; said apparatus comprising means to intermittently advance said strip in a direction along its longitudinal axis, means for successively severing the foremost element from said strip, a member mounted above said strip, means for reciprocally moving said member in a direction toward and perpendicular to the said strip, said member having elements movable therewith and disposed above and immediately to the side of each longitudinal edge of said strip, at least one of said elements having a portion which is so positioned that during a part of the movement of the member downwardly toward the strip, said one element moves past the strip while slidably engaging and cooperating with at least one of said preformed serrations for accurately locating the foremost fastener element with respect to the severing means and for locking said strip against movement longitudinally of itself, said one member element portion clearing said serration when said element portion is above the strip, and means to reciprocably move said member in synchronism with the action of said strip advancing means and said severing means in such manner that said member element portion clears said strip during effective actuation of said advancing means and slidably engages said strip immediately prior to and during initial effective actuation of said severing means.

4. An apparatus as set forth in claim 3 wherein the element and member element portion comprises a serrated pilot.

5. An apparatus as set forth in claim 3 wherein the element and member element portion comprises a serrated pilot whose lower end is raked.

MAURICE VOITY.